United States Patent [19]

Dudek

[11] 4,006,784

[45] Feb. 8, 1977

[54] FLUID OPERATED POWER TOOL

[75] Inventor: Edmund C. Dudek, St. Charles, Ill.

[73] Assignee: Thor Power Tool Company, Aurora, Ill.

[22] Filed: Oct. 6, 1975

[21] Appl. No.: 620,018

Related U.S. Application Data

[62] Division of Ser. No. 359,640, May 14, 1973, Pat. No. 3,920,082.

[52] U.S. Cl. .................................. 173/12; 173/170

[51] Int. Cl.[2] .......................................... B23Q 5/06

[58] Field of Search .................... 173/12, 169, 170; 310/50

[56] References Cited

UNITED STATES PATENTS

| | | | |
|---|---|---|---|
| 2,299,881 | 10/1942 | Deno | 173/170 X |
| 2,310,166 | 2/1943 | Way | 310/50 X |
| 2,776,385 | 1/1957 | Modrey | 310/50 X |
| 3,196,298 | 7/1965 | Kent | 310/50 |
| 3,572,447 | 3/1971 | Pauley | 173/12 |

*Primary Examiner*—Ernest R. Purser
*Assistant Examiner*—William F. Pate, III

[57] ABSTRACT

A pneumatic power tool having a torque sensing control system is disclosd which is capable of consistently applying a precise torque to a fastener so that uniform tightening of any number of fasteners can be obtained. A torsional strain responsive transducer is mounted internally in the tool body and includes a strain gauge network mounted on a torsionally resilient portion of one of the gear cases of the drive train of the tool, the gear case being subject to a reaction component of the torque being transmitted through the drive train. The strain gauge network provides a control signal which effects energization of a solenoid-actuated air shut-off valve in the handle of the tool to automatically terminate the operation of the tool when a predetermined torque is obtained at the output spindle. The control system permits adjustment of the torque output of the tool and provides a visual readout of such output. Because of its fast action, the solenoid-actuated shut-off valve substantially eliminates reaction torque at the handle of the tool and the components thereof are compactly arranged.

The sound level of the exhaust air from the pneumatic motor is attenuated by a tortuous flow path through the interior of the tool, and the electrical conductors for the strain gauge network are also routed through the interior of the tool. Consequently, the exterior of the tool is clean.

The portion of the housing of the tool that surrounds the transducer is in two parts so that certain of the components of the tool may be assembled without relative rotational movement. The two-piece housing also facilitates access to the transducer and other parts of the tool without disassembling the same.

3 Claims, 10 Drawing Figures

FLUID OPERATED POWER TOOL

BACKGROUND OF THE INVENTION

This application is a division of U.S. Patent Application Ser. No. 359,640, filed May 14, 1973 now U.S. Pat. No. 3,920,082 and relates to power tools, and more particularly relates to a power tool having a torque sensing control system for precisely controlling the torque output of the tool.

SUMMARY OF THE INVENTION

Of the many requirements to be satisfied by power tools utilized to apply torque to threaded fasteners in mass production operations, such as automobile assembly plants and the like, preciseness and consistency of the torque output are most important. Consequently, various types of control devices and systems have been developed in an effort to obtain uniform tensioning of the fasteners in production line items.

While many of the torque control devices and systems heretofore advanced have proven generally satisfactory for their intended purpose, others have not, for various reasons. Some of such reasons are inconsistent control of the peak dynamic torque output of the tool, difficulty and/or complexity of adjustment of the torque output setting of the tool, slow response to peak torque values resulting in the application of undesirably high reaction torque forces on the operator, large size resulting in excessive tool bulk, and high cost.

Accordingly, it is a general object of the present invention to provide a novel power tool and torque sensing control system which is not subject to the foregoing disadvantages.

Another object is to provide a novel power tool having a consistent and precise torque output.

A more particular object is to provide a novel power tool having a control system for controlling the torque output of the tool, wherein a reaction-type transducer is utilized to provide a control signal to the control system for effecting a shut-off of the tool at a predetermined torque value.

Still another object is to provide a novel power tool and torque control system of the foregoing character, wherein the transducer is mounted in the tool so as to be subject to the reaction torque in the drive train of the tool.

A further object is to provide a novel transducer construction for use in a torque control system for a power tool, wherein a plurality of strain gauges are utilized as torque responsive elements and wherein the strain gauges can be easily and accurately mounted on the transducer.

Still another object is to provide a novel transducer construction of the foregoing character, wherein the sensitivity of the transducer can be varied to suit the requirements of different tools.

A further object is to provide a novel arrangement for routing the electrical conductors of the torque responsive control system of a power tool through the interior of the tool so that the exterior of the tool is "clean".

Still another object is to provide a novel arrangement for temporarily locking the drive train of a power tool having an internally mounted reaction-type transducer so that the associated electronic torque control system of the tool can be adjusted and/or calibrated without disassembling the tool.

A further object is to provide a novel solenoid controlled shut-off valve for automatically shutting off the supply of air to the pneumatic motor of a power tool in response to a peak dynamic torque signal from an electronic torque responsive transducer in the tool.

A still further object is to provide a novel shut-off valve for a pneumatic power tool which is capable of rapidly shutting-off the supply of air to the air motor of the tool throughout a wide range of line pressures so that reaction free operation of the tool is maintained.

Another object is to provide a novel mounting arrangement for the electrical reset switch of a torque control system for a pneumatic power tool, wherein the switch is actuated in response to movement of the throttle lever of the tool.

Still another object is to provide a novel two-piece housing construction for a power tool, which facilitates the assembly and disassembly of the tool, provides access to the interior of the tool for inspection and testing of internal components, and interchanging of modular components of the tool.

A further object is to provide a novel exhaust system for a pneumatic power tool, which effectively attenuates the sound level of the exhaust air flow of the tool without supplemental muffling or increasing the bulk of the tool.

Other objects and advantages of the invention will become apparent from the following detailed description and accompanying sheets of drawings, wherein:

FIG. 1 is an elevational view showing the overall construction and arrangement of the parts of the power tool and torque control system of the present invention;

FIG. 2. is a somewhat enlarged, broken, longitudinal sectional view, with some parts in elevation, of the power tool shown in FIG. 1, portions of the tool being displaced for convenience of illustration;

Briefly described, the present invention contemplates a novel power tool capable of consistently applying a precise torque to a threaded fastener so that a uniform degree of tightening of any number of the fasteners can be obtained. To this end, the tool incorporates a novel torque responsive control means which serves to rapidly and precisely terminate the operation of the tool when the required torque has been applied to a fastener. A reaction-type transducer, which utilizes a plurality of electromechanical torsional strain responsive elements, is incorporated into one of the structural elements of the tool so as to be subject to the torque being transmitted through the drive train of the tool. The construction of the transducer is such that the torsional resilience, and hence the sensitivity of the transducer, may be varied after manufacture to suit the sensitivity requirements of different tools.

A series of bores and recesses are provided in the various parts of the tool to permit electrical conductors, which are connected to the transducer, to be conveniently routed through the interior of the tool. The exterior of the tool is thus free of electrical conductors and connectors.

A novel clamshell-type construction is utilized in the portion of the housing of the tool surrounding the transducer so that the transducer is accessible from the exterior of the tool without completely disassembling the same and so that the transducer cable is not stressed.

The power tool, to be hereinafter described in detail, also includes a novel arrangement for externally locking the motor of the tool against rotation so that the visual readout of the torque control system can be periodically checked and adjusted.

A novel shut-off valve assembly is mounted in the handle of the tool for automatically shutting-off the flow of air to the pneumatic motor of the tool when a predetermined torque has been applied to a fastener. The shut-off valve assembly includes a fluid pressure actuated shut-off valve member and solenoid-actuated pilot valve member. The pilot valve member serves to vent pressure from a chamber at one end of the control valve, which is pressure balanced, so that a rapid closure of the shut-off valve member is obtained, regardless of the line pressure at the tool.

In the specific embodiment of the invention to be hereinafter described, a pneumatic motor is utilized as the prime mover of the tool and a manually actuated throttle valve is utilized to control the operation of the motor. An electrical switch is mounted in the handle of the tool so as to be actuated by a lever which shifts the throttle valve. The electrical switch serves to reset the electrical circuitry of the control system at the completion of a torquing operation when the throttle lever is released.

THE OVERALL CONSTRUCTION OF THE TOOL AND ITS TORQUE CONTROL SYSTEM

Figures 1, 6, 7, 8, 9, 10:
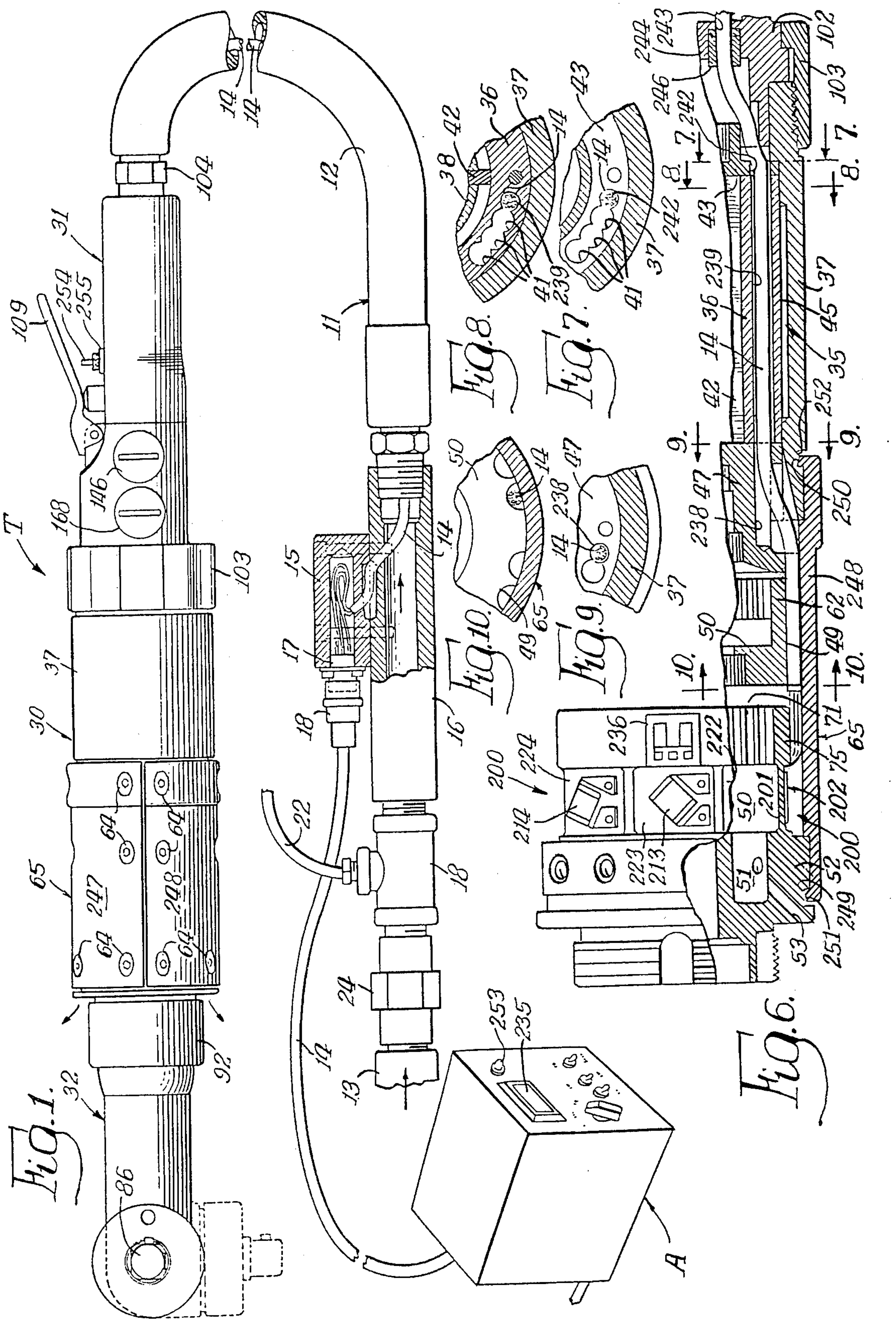
FIG. 6 is a fragmentary longitudinal sectional view, with some parts in elevation, of one of the gear cases of the tool and showing the routing arrangement of an electrical cable of the tool from the gear case through the other parts thereof to the handle.
FIGS. 7–10, inclusive, are series of fragmentary sectional views taken along the lines 7—7, 8—8, 9—9 and 10—10, respectively of FIG. 6.

In FIG. 1, a power tool T embodying the features of the present invention, is illustrated. In the present instance, the tool T comprises a nutsetter which employs a pneumatic motor as its prime mover. Thus, air under pressure is supplied to the tool T through an air hose 11 which includes a "whip" portion 12 and an extension portion 13 connected to a remote, regulated, source of the air under pressure. A reaction type transducer, to be hereinafter described in detail, is mounted in the tool T and provides an electrical signal proportional to the torque output of the tool. A torque setting and readout device, which contains the electrical circuits of the control system and which will be described more fully hereinafter, is indicated generally at A.

The control device A is connected to the tool T by a multiple conductor electrical cable, a portion 14 of which extends between the device A and an outlet boss 15 on a junction fitting 16 in the air hose 11. A socket 17 is mounted in the boss 15 for receiving a mating plug 18 on the end of the cable 14. The cable 14 enters the interior of the air hose 11 at the fitting 16 and then proceeds through the whip portion 12 to the tool T.

A tee fitting 18 may be connected to the upstream end of the junction fitting 16 to provide an inlet for one end of an oiler hose 22. The opposite end of the hose 22 is connected to a suitable oiling system (not shown) which supplies measured quantities of oil to the interior of the air hose 11 for lubricating the pneumatic motor in the tool T. A union 24 may be provided between the tee-fitting 18 and the portion 13 of the air hose 11.

THE CONSTRUCTION OF THE TOOL T

Figure 2:
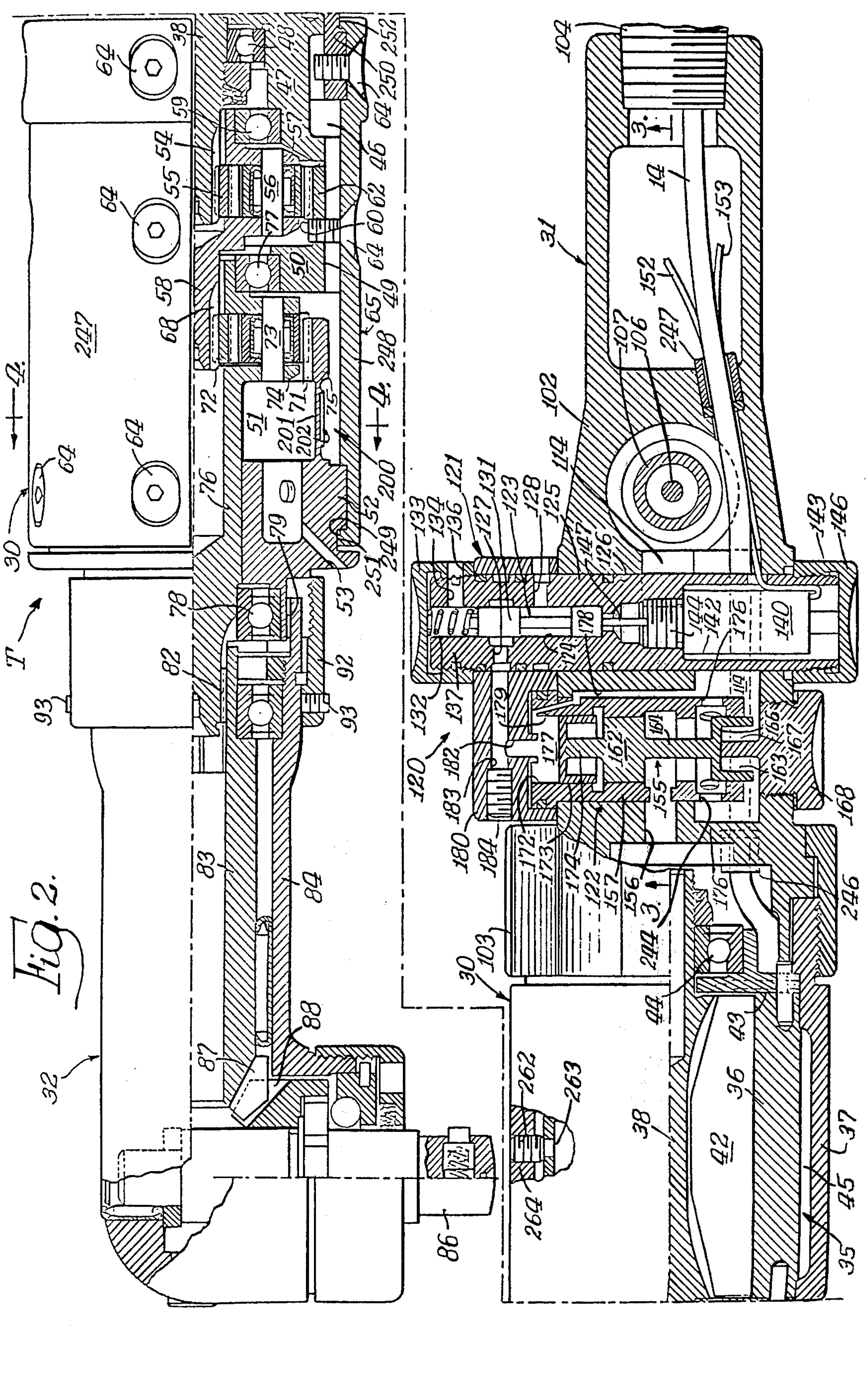

Referring now to FIG. 2, in conjunction with FIG. 1, the tool T comprises a generally cylindrical tool body 30 having a handle 31 secured to one end thereof, and torque output means in the form of a right angle nutsetter attachment 32 is secured to the opposite end of the body 30.

The body 30 includes a motor, indicated generally at 35, which is of the pneumatic type and which includes a cylindrical cylinder block 36 that is enclosed and supported by a sleeve-like housing 37. A rotor 38 is rotatably supported in the cylinder block 36, and a plurality of radially extending, longitudinally arranged slots (not shown) are provided in the rotor for receiving a plurality of blades 42. The blades 42 are urged radially outwardly in the rotor slots and into fluid pressure sealed engagement with the inner wall of the cylinder block 36 by bleed air from the air supply passages in the body 30. The blades 42 thus define chambers therebetween for receiving air under pressure from an air supply passage in the handle 31. Air under pressure flows into the chambers in the motor 35 through a pair of circumferentially extending, axially spaced slots (not shown) in the cylinder block 36, such air being communicated to the inlet slots by connecting passages in the cylinder block 36 and a plurality of intersecting axial bores 41 (FIG. 7) in an end plate 43. The end plate 43 also serves to support a bearing assembly 44 for the rear or right end of the rotor 38, as seen in FIG. 2.

EXHAUST AIR FLOW ARRANGEMENT

Air exhausts radially outwardly from the chambers of the motor 35 through a series of circumferentially extending, axially spaced slots (also not shown) in the side wall of the cylinder block 36 in spaced relation from the inlet slots. The exhaust air then enters a clearance space 45 between the cylinder block 36 and sleeve 37 from whence it finds its way to an annular clearance 46 around a sleeve 47 which abuts the opposite end of the cylinder block 37. The sleeve 47 also serves as a mounting for another bearing assembly 48 for the rotor 38. From the annular clearance 46, the exhaust air proceeds through a plurality of circumferentially spaced, axially extending grooves 49 (FIGS. 2 and 7) in a gear case member 50. The exhaust air then proceeds through clearances between the gears of a second stage planetary reduction gear train, to be described presently, and thence to an annular chamber 51 within another gear case member 52 at the left end of the tool body 30 as viewed in FIG. 2. Exhaust air in the chamber 51 discharges to the atmosphere through at least one exhaust air discharge port in the gear case member 52. In the present instance, such exhaust air discharge port comprises a ring of angularly extending bores 53 in the member 52.

The aforementioned tortuous path of the exhaust air flow, which terminates with the ring of bores 53 in the gear case member 52, effectively attenuates the sound level of the exhaust air flow so that no additional muffling is required. Thus, size, weight or cost of the tool T remains unchanged as a result of the foregoing exhaust air arrangement.

In order to multiply the torque available from the motor 35, reduction gearing is provided. Such reduction gearing, in the present instance, comprises a two-stage planetary system which includes splines 54 on the left end, as viewed in FIG. 2, of the rotor 38, which mesh with a plurality of idler or planet gears 55. In the present instance, four idler gears 55 are meshed with the splines 54 and are rotatably mounted on pins 56 which are carried in the carrier portion 57 of another spindle 58. A bearing assembly 59 is mounted in the sleeve 47 and serves to support the adjacent end of the carrier 57. The idler gears 55 mesh with teeth 60 formed on the interior of an axially extending portion 62 of the gear case member 50. The gear case member 50 is fixedly mounted in the tool body 30 by a plurality of screws 64 which extend through openings in a two-piece housing 65, the construction and mode of operation of which will be described more fully hereinafter.

The second stage of the planetary reduction gear system comprises splines 68 on the spindle 58, which mesh with a plurality of planet or idler gears 72 that are mounted on pins 73 secured in the carrier portion 74 of another spindle 76. Four circumferentially spaced idler gears 72 are carried by the carrier portion 74, the idler gears 72 meshing with teeth 71 on the interior of an axially extending portion 75 of the gear case member 52 and comprising the ring gear of the second stage planetary reduction gear system. The right end of the spindle 76, as viewed in FIG. 2, is supported by a bearing assembly 77 which is mounted in the gear case member 50. The left end of the spindle 76 is rotatably mounted in another bearing assembly 78, which is carried in an axially extending, circumferentially interrupted flange portion 79 of the gear case member 52. The remote left end, as viewed in FIG. 2, of the spindle 76 is externally splined as at 82 to mesh with the input shaft 83 of the right angle nutsetter attachment 32.

The attachment 32 includes a housing 84 in which the input shaft 83 is rotatably journaled. A torque output member or spindle 86 is also rotatably journaled in the housing 84 with its axis extending at a right angle to the axis of the input shaft 83. Bevel gears 87 and 88, on the shaft 83 and spindle 86, respectively, serve to transmit torque from the shaft 83 to the spindle 86.

The right angle nutsetter attachment 32 is detachably connected to the body 30 of the tool T by a collar 92 which threadably engages the flange portion 79 of the gear case member 52. Set screws 93 are provided to prevent unintentional unthreading of the collar 92 from the body 30.

It will be understood that other types of attachments, such as screw driver, or the like, could be connected to the body 30 of the tool T and driven by the spindle 76, instead of the nutsetter 32.

The handle portion 31 of the tool 10 comprises an elongated housing 102, which is detachably connected to the right end of the body 30, as viewed in FIGS. 1 and 2, by a threaded collar 103. Specifically, the collar 103 is threaded onto the right end of the motor cylinder housing 37. Indexing means (not shown) serves to maintain the housing 102 of the handle 31 properly oriented with respect to the motor housing 37. The distal or right end, as viewed in FIGS. 1 and 2, of the handle 31 is threaded to receive a hose fitting 104 carried on the whip portion 12 of the air hose 11. Thus, air under pressure enters the handle 31 through the fitting 104 and then passes through passages in the handle to a throttle valve assembly, indicated generally at 105. The throttle valve assembly 105 includes a spool-type throttle valve 106. which is shiftably mounted in a bushing 107 and which is normally biased to a closed portion by a spring 108. The valve 106 is manually shifted to an open position by a lever 109, which is pivotally secured to the housing 102 by a pin 112. Thus, when the handle 108 is depressed by the operator to initiate a torquing operation, the valve 106 is shifted downwardly in its bushing 107 thereby permitting air under pressure from the air hose 11 to flow through the passages in the handle to a chamber 113 at the lower end of the valve 106, around the valve, and thence through ports (not shown) in the bushing 107 to a chamber 114 which communicates with a shut-off valve assembly, indicated generally at 120 in FIG. 2.

THE CONSTRUCT OF THE SHUT-OFF VALVE ASSEMBLY 120

The shut-off valve assembly 120 includes a pilot valve portion 121 and a shut-off valve portion 122. The pilot valve portion 121 comprises a spool-type valve 123, which is shiftably mounted in a bore 124 in an elongated bushing 125. The bushing 125 is in turn mounted in a bore 126 in the handle housing 102, which extends transversely to the axis of the housing 102. A pair of ports 127 and 128 intersect the bore 123 and are axially offset with respect to the axis of the bore. Communication between the ports 127 and 128 is controlled by the upper, full diameter portion 131, of the spool valve 123, as viewed in FIG. 2.

The pilot valve 123 is normally biased to its closed position in FIG. 2, by a coil spring 132, the inner end of which engages the adjacent end of the valve and the outer end of which bears against the inner surface of a cap 133 threaded onto the projecting end of the bushing 125. Aligned cross bores 134 and 136 in the bushing 125 and cap 133, respectively, assure free movement of the valve 123 in its bore 124.

Upward movement of the valve 123 in its bore 124 to a position establishing communication between the ports 127 and 128 is effected by a solenoid 140 mounted in a counterbore 142 in the end, indicated at 143, of the bushing 125, opposite from the end 137. The inner end, indicated at 144, of the solenoid 140 is threaded into a reduced diameter portion of the counterbore 142, and a cap 146 is threaded onto the end 143 of the bushing 124 to close the bore 142 and to provide a dirt seal.

The plunger, indicated at 147, of the solenoid 140 engages the lower end face, as viewed in FIG. 2, of the pilot valve 123 and serves to shift the pilot valve upwardly to establish communication between the ports 127 and 128 when the solenoid 140 is energized. The electrical conductors for the solenoid 140 are indicated at 152 and 153, respectively, in FIG. 2.

The shut-off valve portion 122 of the shut-off valve assembly 120 includes a shut-off valve member 155, which is also of the spool-type and which serves to control communication between the chamber 114 and a generally axially extending passage 156 in the handle housing 102. The passage 156 communicates with the intersecting axial bores 41 (FIG. 7) in the plate 43 and hence with the inlet ports in the cylinder block 36 of the motor 35, as previously described.

As will be apparent from FIG. 2, the shut-off valve 155 is mounted in a bushing 157 positioned closely adjacent to the pilot valve bushing 125 and having its axis parallel with the axis of the bushing 125. The shut-off valve 155 includes a pair of spaced lands 162 and 163 of substantially the same outside diameter, and a reduced diameter, connecting portion 164 defining an annular space therebetween. The lower land 163, as viewed in FIG. 2, is cup-shaped so as to permit a projection or stop 167 on a plug 168 that is threaded into the housing 102, to extend into the interior of the land 163 and engage the inner end face 166 of the cavity. The stop 167 thus limits downward movement of the valve 155.

The upper portion, indicated at 172, of the bore of the bushing 157, as viewed in FIG. 2, is of somewhat greater diameter than the portions of the bore in which the lands 162 and 163 are mounted, and a cup-shaped cap 173 is slidably mounted in the bore portion 172 so as to engage an upwardly or outwardly projecting stem portion 174 of the valve land 162. The arrangement is such that when the cap 173 and valve 155 are shifted upwardly, as viewed in FIG. 2, to their fullest extent, the land 163 will prevent air under pressure in the chamber 114 from flowing through a ring of ports 176 in the lower end of the sleeve 157, as viewed in FIG. 2, and thus to the passage 156.

The shut-off valve 155 is held in its open position illustrated in FIG. 2 by the force resulting from pressure in a chamber 177 defined in part by the outer or upper end face, indicated at 175, of the valve cap 173. Air at substantially the same pressure as in the chamber 114 is communicated to the chamber 177 by a transverse bore 178 in the handle housing 102, and a connecting bore 179 which is of sufficiently small diameter to prevent rapid flow of air through the bore 178 into the chamber 177.

A short transverse bore 182 in a housing portion 180 of the shut-off valve assembly 120 intersects a longitudinal bore 183 therein, one end of the bore 183 registering with the port 127 in the pilot valve portion 121 and the opposite end of the bore 183 being closed by a threaded plug 184. Thus, the chamber 177 will be vented to the atmosphere through the bores 182 and 183 and ports 127 and 128 in the pilot valve portion 121 when the pilot valve 123 is shifted to its open position by the solenoid 140. When this occurs, the rapid venting of pressure in the chamber 177 to the atmosphere will occur and the shut-off valve 155 will be rapidly shifted to its closed position as a result of the pressure in the chamber 114 acting on the end face surfaces of the land 163. Consequently, the flow of air under pressure to the motor 35 is cut-off in a matter of a few milliseconds and the torque output of the motor is thereby reduced to zero in substantially the same time interval.

Energization of the solenoid 140 of the shut-off valve assembly 120 by supplying current to the conductors 152 and 153 thereof is controlled by electrical circuitry in the torque control and readout device A (FIG. 1). However, before the solenoid 140 is energized, a control signal of predetermined magnitude must be received by the device A. Such control signal, which is a function of the torque being delivered by the output spindle 86 of the tool T, is derived from transducer means in the tool T, now to be described.

CONSTRUCTION OF THE TORQUE RESPONSIVE TRANSDUCER

Figures 3, 4, 5:
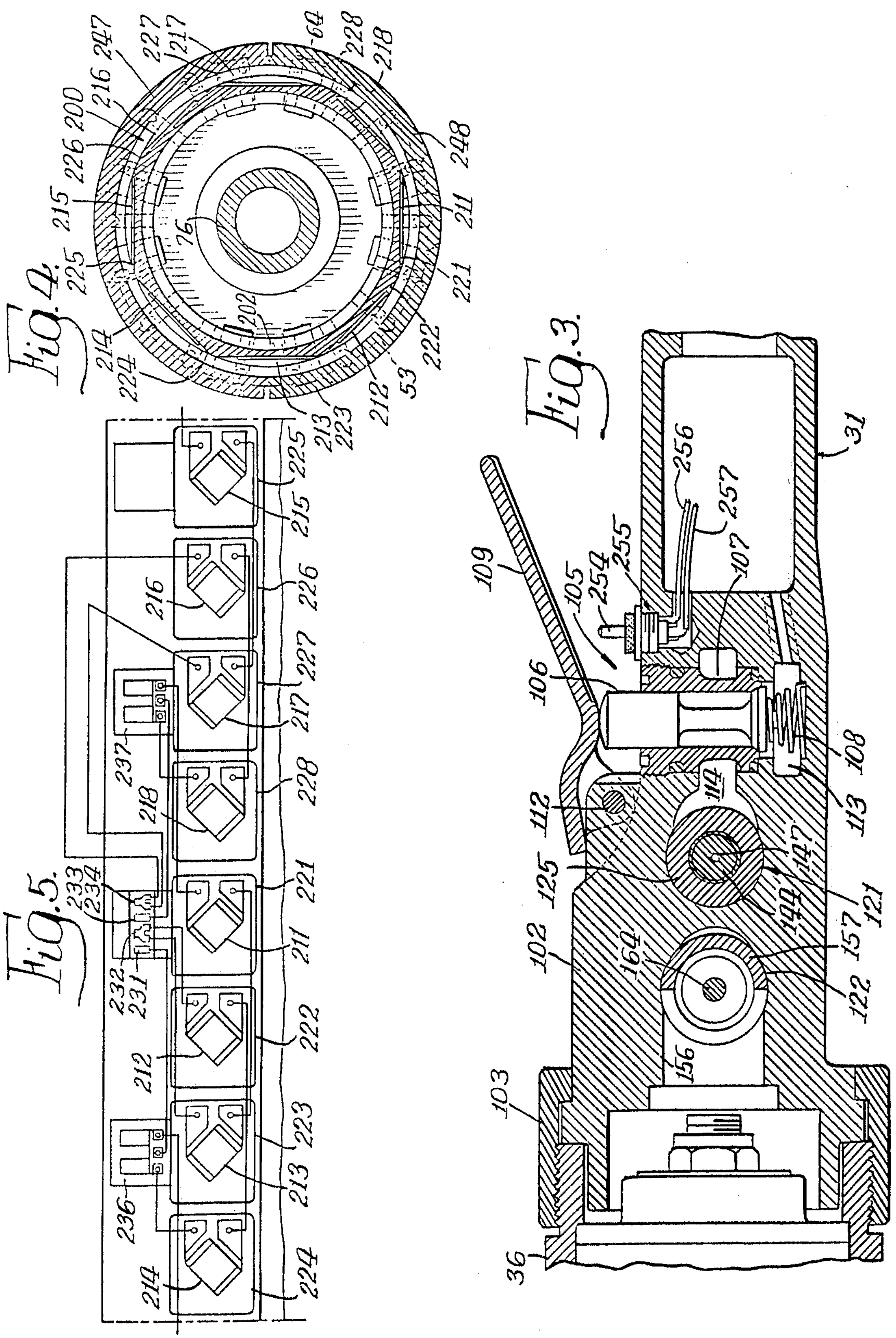
FIG. 3 is a fragmentary, longitudinal sectional view, with some parts in elevation, taken along the line 3—3 of FIG. 2.
FIG. 4 is a transverse sectional view taken along the line 4—4 of FIG. 2.
FIG. 5 is a layout showing the mounting arrangement of and electrical connections between the strain gauges of the torque sensing transducer of the invention.

Referring now to FIGS. 4–6, inclusive, in conjunction with FIG. 2, the tool T includes transducer means, indicated generally at 200, for generating a signal proportional to the torque output at the spindle 86. Such signal actuates circuitry in the control device A to energize the solenoid 40 of the shut-off valve assembly 120 to terminate a torquing operation when the torque output at the spindle 86 reaches a predetermined peak dynamic value. The transducer means 200 thus comprises a torsionally resilient portion 201, and at least one and preferably a plurality of torsional strain responsive signal generating elements, indicated generally at 202, and mounted on the torsionally resilient portion 201.

The torsionally resilient portion 201, in the present instance, comprises an annular, thin-walled portion of the gear case member 52 between the ring gear 75 and main body portion of the member. Since the ring gear 75 and thin-walled portion 201 are integral with the gear case member 52, the thin-walled portion 201 is subjected to the reaction torque from the ring gear 75 when the tool T is in operation. Consequently, the portion 201 will deflect torsionally in direct proportion to the reaction torque imposed on the ring gear 75, and the torsional strain in the portion 201 at any instant will be a direct function of the torque output at the spindle 86 and hence of the torque being applied to a nut or other fastener to which the spindle 86 is connected.

The torsional strain responsive signal generating elements 202 comprise at least one and, in the present instance, eight strain gauges, respectively indicated at 211–218, inclusive, in FIGS. 4 and 5. Each of the strain gauges 211–218, in the present instance, is preferably of the foil type and has a nominal resistance of 350 ohms plus or minus 0.2% and a gauge factor of 2.095 plus or minus 0.5%.

In one exemplary mounting arrangement of the strain gauges 211–218, the outer periphery of the torsionally resilient portion 201, may be provided with eight flat surface portions 221–228, inclusive, for receiving the strain gauges 211–218, respectively. In other words, the outer periphery of the resilient portion 201 is octagonal in cross section, as will be apparent from FIG. 4. The aforementioned difference in geometrical shape between the outer and inner peripheries of the portion 201 (octagonal and circular, respectively) provides an important advantage in that the wall thickness of the material of the portion 201 at the center of each of the flat surface portions 221–228, inclusive, is thinner than at the corners of the surface portions. Consequently, the greatest torsional flexure of the material of the portion 201 will occur at the center of the flat surface portions 221–228. This is desirable since the strain gauges 211–218, inclusive, are mounted centrally on the surface portions 221–228.

It should also be noted that the strain gauges 211–218 are mounted on the surface portions 221–228 so that their lines of maximum response are generally disposed parallel to the lines of maximum torsional strain of the material of the torsionally resilient portion 201. In other words, the strain gauges 211–218, inclusive, are oriented at 45° with respect to the axis of the torsionally resilient portion 201 and the maximum response axes of the gauges are respectively disposed at alternate angles of 45° with respect to the axis of the resilient portion 201.

The strain gauges are electrically connected in a Wheatstone bridge network, the various branches of the network terminating in a terminal strip having four contacts indicated at 231, 232, 233, and 234, respectively. Two pairs of trimming resistors 236 and 237 are provided in the strain gauge circuit to facilitate calibration of the transducer 200 prior to installation of the same into the tool T, as will be described more fully hereinafter.

The strain gauges 211–218 are secured to the flat outer surfaces of the torsionally resilient portion 201 by conventional bonding techniques, i.e. by applying a suitable adhesive to the flat surface to which the strain gauges are to be attached and, after the strain gauges have adhered to the surface, covering the same with successive layers of suitable protective coatings.

CALIBRATION OF THE TRANSDUCER 200

After the strain gauges 211–218 have been encapsulated, the gear case member 52 is then mounted in a dead-weight checker and the voltage change versus torsional load for the transducer 200 is then plotted. Any variation of the curve from a standard curve are then made by adjustments to the trimming resistors 236 and 237. The dead-weight checker is also used to check the torque readout on the screen, indicated at 235, of the device A. The sensitivity of the transducer 200 may be increased by milling or otherwise removing material from the inner surface of the resilient portion 201.

After the transducer 200 has been calibrated, the gear case member 52 is installed in the body 30 of the tool T in the manner illustrated in FIG. 2 and secured therein by the screws 64. The conductors of the cable 14 are then connected to the contacts 231–234 of the transducer 200, as by soldering.

ROUTING OF THE ELECTRICAL CABLE 14

The electrical cable 14 is routed through the interior of the tool T, in the manner illustrated in FIG. 6, in order to improve the safe operating characteristics of the tool and to prevent damage to the cable. To this end, the cable 14 extends rearwardly or toward the right, as viewed in FIGS. 2 and 6, from the gear case member 52 between the exterior of the portions 201 and 75 and the inner surface of the housing 65. The cable 14 then extends through one of the axially extending, semicylindrical recesses 49 (FIGS. 6 and 10) in the periphery of the gear case member 50.

From the gear case member 50, the cable 14 extends into the clearance space 46 between the outer periphery of the bearing support sleeve 47 and the housing 65 and then passes through a bore 238 (FIG. 9) in the sleeve 47, which extends inwardly from the right end face thereof, as viewed in FIGS. 2 and 6. The bore 238 is in alignment with another axially extending bore 239 (FIGS. 8 and 9), in the cylinder block 36 of the motor 35.

The cable 14 then extends through a drilled hole 242 in the motor end plate 43 from which the cable 14 passes through another axial hole 243 in the recessed end wall 244 of the handle housing 102. A cable seal bushing 246 prevents fluid pressure loss between the cable 14 and hole 243.

The outer or right end of the hole 243 communicates with the chamber 114 so that the cable 14 passes through this chamber and around the bushings 157 and 125 of the shut-off valve assembly 120 in the manner illustrated in FIG. 2. The cable then proceeds through another seal bushing 247 in the handle housing 102 before entering the hose fitting 104 and air hose 11.

THE TWO-PIECE CONSTRUCTION OF THE HOUSING 65

The aforementioned two-piece construction of the housing 65 facilitates assembly of the tool T and holds the components thereof in assembled relation. The housing 65 also facilitates connection of the conductors of the cable 14 to the contacts 231–234 of the transducer 200 during assembly and disassembly of the tool and prevents any stress from being imposed on the cable 14 due to relative rotation between the various parts of the tool. The housing 65 thus includes a pair of semi-cylindrical portions 247 and 248 (FIGS. 1, 2 and 4) having radially inturned flange portions 249 and 250 at the opposite ends thereof. The flange portions 249 and 250 extend into annular grooves 251 and 252 in the gear case member 52 and motor housing 37, respectively, when the housing portions 247 and 248 are assembled. Such assembly is accomplished by radially shifting the housing portions 247 and 248 into engagement with the other parts of the tool body 30, with a "clamshell"-type movement, and securing the parts together with the screws 64. A similar movement is employed when the housing portions 247 and 248 are disassembled.

OPERATION OF THE TOOL T AND CONTROL DEVICE A

After the transducer 200 has been calibrated and the gear case member 52 mounted in the tool T, as previously described, the latter is ready for operation. It is assumed that the pressure of the source of air to which the air hose 11 is connected is regulated and has been set to provide the required line pressure at the tool T so as to obtain a desired dynamic peak torque output at the output spindle 86 during a torquing operation. It is further assumed that the control device A is energized and is set in the torque readout mode. The torquing operation is initiated when the operator of the tool depresses the lever 108 to open the valve 106 of the throttle valve assembly 105 and thereby permit live air to flow through the passages in the handle 31 to the motor 35 in the tool body 30. Such flow passes through passages in the handle housing 102, through the throttle valve assembly 105 and into the chamber 114 (FIGS. 2 and 3), which extends around the pilot valve bushing 125 and communicates with the ring of inlet ports 176 in the shut-off valve bushing 157. Air under pressure in the chamber 114 then flows through the inlet ports 176 around the reduced diameter portion 164 of the shut-off valve 155 and thence through the passage 156 to the inlet bores 41 (FIG. 7) in the motor end plate 43. The live air then enters the chambers in the motor 35 to drive the same and effect rotation of the rotor 38 thereof. The torque output from the spindle 38 is multiplied by the two-stage planetary reduction gear system 54, 55, 62 and 68, 72, 75. The torque output from the second stage planetary gear train is transmitted by the spindle 76 to a torque applying attachment connected to the tool body 30, in the present instance the right angle nutsetter 32. The drive from the spindle 76 is through splines 82 on the outer or left end thereof, as viewed in FIG. 2, through an input shaft 83 in the attachment 32, bevel gearing 87 and 88, and thence to the output spindle 86 thereof.

As the fastener to which the tool T is connected becomes progressively tightened, the reaction force in the drive train, including the ring gear 75 of the gear case member 52, increases. Such reaction torque causes a degree of torsional deflection in the torsionally resilient portion 201 of the transducer 200, which deflection is in direct proportion to the torque output at the spindle 86. The torsional deflection of the portion 201 causes the resistance in the strain gauges 211–218 of the transducer 200 to change. Such resistance change is sensed by strain gauge circuitry in the device A and comprises a control signal which serves to energize another circuit in the device A to cause current to be supplied to the solenoid 140 of the shut-off valve assembly 120 when the torque output at the spindle 86 reaches a predetermined peak dynamic valve. Energization of the solenoid 140 causes the pilot valve 123 to be rapidly shifted upwardly in its bore 124, as viewed in FIG. 2. Consequently, the ports 127 and 128 are brought into communication so that air under pressure in the chamber 177 of the shut-off valve portion 122 is vented to the atmosphere through the bores 182 and 183 in the shut-off valve housing portion 180. Venting of the chamber 177 permits air at line pressure in the chamber 114 to act only upon the end face portions of the land 163 of the shut-off valve 155 so that the latter is rapidly shifted upwardly in the bushing 157 to a position preventing further flow of air under pressure to the outlet passage 156 in the handle 31. Consequently, the motor 35 of the tool T rapidly stops. Such rapid shut-off of the flow of air to the motor 35 prevents any substantial reaction torque from being applied through the handle 31 of the tool to the operator.

Assuming that the peak dynamic torque applied to the fastener is within production tolerances, the operator need only remove the tool from the fastener and then release the throttle lever 109 so that the latter moves to the position thereof illustrated in FIGS. 1 and 3. As the lever 109 moves to such position, the plunger 254 (FIGS. 1 and 3) of a control device reset switch 255 moves to its closed position. The switch 255 is connected by a pair of wires 256 and 257, which may be part of the cable 14, to circuitry in the control device A. Such circuitry deenergizes the circuit which supplies current to the solenoid 140 of the shut-off valve assembly 120. Consequently, the pilot valve 123 shifts to the position thereof illustrated in FIG. 2 so that the chamber 177 is no longer vented to the atmosphere. Pressure then again builds up in the chamber 177 as a result of the bleed air flow thereto through the passages 178 and 179, and the shut-off valve 155 is then moved to its open position, as illustrated in FIG. 2. Consequently, the tool T is then ready for another torquing operation.

In order to permit periodic checking of the accuracy of the torque readout on the screen 235 while the tool is in operation and after assembly, a locking arrangement is provided for temporarily locking the rotor 38 of the motor 35 against rotation so that the tool may be placed in a dead-weight analyzer and a known load applied to the spindle 86 to check the torque readout of such load on the screen 235. The aforementioned locking arrangement, in the present instance, comprises a radial bore 262 (FIG. 2) in the side wall of the motor housing 37, and a coaxial bore in the side wall of the motor cylinder block 36. Such bores 262 and 263 permit a suitable locking device, such as a pin or rod (not shown) to be inserted therethrough and into one of the chambers between a pair of the blades 42 of the motor 35. The rotor 38 is thus locked against rotation by the pin or rod and a known load may then be applied by the dead-weight device to the spindle 86. If the readout on the screen 235 does not coincide with the torque applied from the dead-weight device, the readout may be corrected by adjusting a trimming potentiometer (not shown) in the device A.

After the readout on the screen 235 has been adjusted to correspond with the known applied load on the spindle 86, the tool T is then ready for further operation. The aligned holes 262 and 263 may be closed by a set screw 264 when not in use.

When the tool T is to be utilized in a production line application where a central computer is utilized to control the operation of other tools on the line, the control device A could be simplified to eliminate the torque readout screen 235 and other circuitry other than that required to provide an analog signal.

It should be understood that while the invention herein disclosed has been described in connection with the tool T, which utilizes a pneumatic motor as its prime mover, the torque sensing and control structure of the invention is also usable with electric motor driven power tools. Such an application is therefore within the scope of the present invention.

What is claimed is:

1. An arrangement for routing electrical conductors through the interior of the body portion and hollow handle of a power tool, said body portion including an elongated tubular housing having said handle at one end thereof and adapted to receive a torque output attachment at the opposite end thereof, a motor having a generally cylindrical casing mounted in said housing, bearing support plates at each end of said motor casing and engaging the inner surface of said housing, a reduction gear case member for supporting reduction gearing in said housing, said reduction gear case member engaging the inner surface of said housing and disposed between one of said motor casing bearing support plates and the torque output end of said housing, and another gear case member at the torque output end of said housing, said other gear gase member including a cylindrical transducer, said routing arrangement comprising an annular clearance between said other gear case member and the inner surface of said housing, at least one axially extending groove in the outer surface of said reduction gear case member, an axial bore in said one motor bearing support plate, and an axial bore in said motor casing having one end registering with the bore in said last mentioned motor bearing support plate and its other registering with an axial bore in the bearing support plate adjacent to said handle, said bore in said bearing support plate adjacent to said handle communicating with the hollow interior of said handle.

2. An arrangement for routing electrical conductors through the interior of the body portion and hollow handle of a power tool, said body portion including an elongated tubular housing having said handle at one end thereof and adapted to receive a torque output attachment at the opposite end thereof, a motor having a generally cylindrical casing mounted in said housing, bearing support plates at each end of said motor casing and engaging the inner surface of said housing, a reduction gear case member for supporting reduction gearing in said housing, said reduction gear case member engaging the inner surface of said housing and disposed between one of said motor casing bearing support plates and the torque output end of said housing, and another gear case member at the torque output end of said housing, said routing arrangement comprising an annular clearance between said other gear case member and the inner surface of said housing, at least one axially extending groove in the outer surface of said reduction gear case member, an axial bore in said one motor bearing support plate, and an axial bore in said motor casing having one end registering with the bore in said last mentioned motor bearing support plate and its other registering with an axial bore in the bearing support plate adjacent to said handle, said bore in said bearing support plate adjacent to said handle communicating with the hollow interior of said handle, said motor including a pneumatic motor, a plurality of grooves being provided in the outer surface of said reduction gear case member and defining a portion of an exhaust system for said pneumatic motor, and one of said exhaust grooves defining said groove for receiving said electrical conductors.

3. The routing arrangement of claim 2, further characterized in that an annular clearance is provided between a portion of said motor bearing support plate adjacent said reduction gearing and the inner surface of said housing, said clearance comprising another portion of said exhaust system for said pneumatic motor, and said axial bore in said last-mentioned bearing support plate intersecting said clearance.

* * * * *